(No Model.)

M. A. CLENNAM.
NUT.

No. 572,743.  Patented Dec. 8, 1896.

Witnesses,

Inventor,
Milton A. Clennam
By Dewey & Co.
Atty

United States Patent Office.

MILTON A. CLENNAM, OF SAN FRANCISCO, CALIFORNIA, ASSIGNOR OF ONE-FIFTH TO HENRY SYLVESTER, OF SAME PLACE.

NUT.

SPECIFICATION forming part of Letters Patent No. 572,743, dated December 8, 1896.

Application filed February 25, 1896. Serial No. 580,742. (No model.)

*To all whom it may concern:*

Be it known that I, MILTON A. CLENNAM, a citizen of the United States, residing in the city and county of San Francisco, State of California, have invented an Improvement in Nuts; and I hereby declare the following to be a full, clear, and exact description of the same.

My invention relates to an improved nut for use upon bolts and at points where it is desirable to lock parts together by the use of a bolt and nut.

It consists in certain details of construction, which will be more fully explained by reference to the accompanying drawings, in which—

Figure 1:
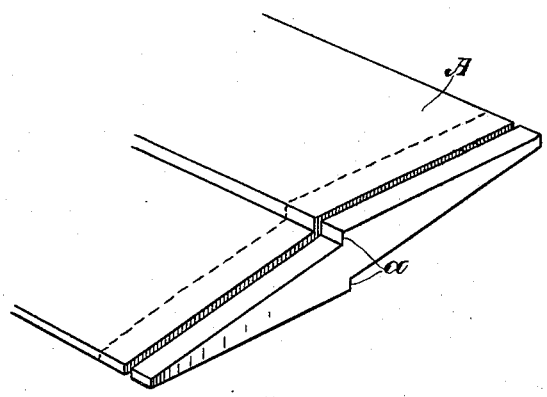
Figure 2:
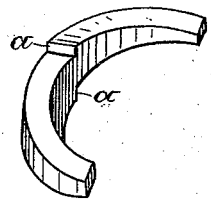
Figure 5:
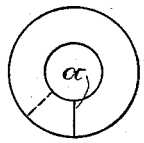
Figure 3:
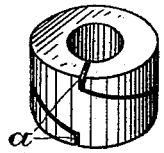
Figure 4:
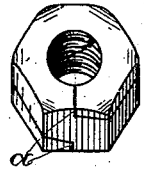

Figure 1 is a view of the sheet from which the nuts are made. Fig. 2 shows a strip half turned. Fig. 3 shows the same completely turned. Fig. 4 is a view of the finished nut. Fig. 5 is a plan of the coil.

Various attempts have been made to form a spiral elastic nut, but where such nuts have been hitherto made from a strip of metal it is impossible to keep any considerable length of the strip properly heated, so as to be continuously introduced, when coiled in a machine such as is necessary for the economical manufacture of such nuts, on account of the small body of metal and the danger of overheating and making it so soft that it will not hold up in proper position. The amount of scale which is produced upon the surface of the metal is also so great that it is impossible to properly tap the threads in the nut after it is completed without first boring it out.

The objects of my invention are to provide an elastic coiled nut which when threaded upon the interior and screwed upon a bolt will form in itself a lock to prevent its being shaken off; to so form the blank or plate from which the nuts are to be made that the portion to be used may be sheared or cut from the plate at the instant before its formation into a nut, so that that part which will form the inner surface of the nut shall present a bright surface of metal, free from scale which would otherwise destroy the tools by which the thread is to be cut; to provide for the greatest strength and depth of the nut-blank at a central point, and to form shoulders against which the ends of the coil abut, so that in cutting the screw-threads the nut will not tend to coil up and become smaller in diameter and bind upon the tool.

A is a sheet of metal rolled out so as to be thinner at the opposite edges than it is at the center and having shoulders or offsets *a*, formed upon opposite sides of the center, as shown. The edges are preferably left of a thickness equal to the depth of the offset *a*. A plate of this description is heated sufficiently for the purpose, and by means of shears or a proper cutting-tool the strips for the nut are cut off successively, as shown by the dotted lines. When cut in this manner, the edges present a bright surface, clean of scale and in proper shape to be operated upon by the screw-cutting tools. These strips then pass at once to that portion of the machine by which they are coiled into the form shown in Fig. 3, and the nut is formed before there is any opportunity for further formation of scale. In thus coiling the nut the ends of the strips are brought into contact with and abut against the shoulders *a*, so as to form stops to prevent any further compression or winding of the nut by any twisting strain which may be brought upon it, such as the cutting of the internal screw-threads by means of a tap or the subsequent application of the nut to a bolt. If these shoulders were not formed, the friction of the tap turning within the coil would tend to still further slide the parts of the coil over one another, and thus cause the nut to bind so tightly that it could not be turned, but these shoulders provide a limit and a stop, so that this action cannot take place.

The length of the strips from which the nuts are formed is such that each nut is formed by a little less than two complete turns, as shown by the dotted lines in the plan view Fig. 5, the ends of the strip abutting against the shoulders upon opposite sides of the nut and preferably within the space occupied by one of the sides when the nut is made hexagonal in form. It will be seen by this construction that the full depth and thickness of the nut is comprised in this side, which is formed from the central and thickest portion of the blank. This enables me to distribute the elastic quality evenly from one end to the other, whereas if the nut be formed by coiling up a strip or bar of approximately the same thickness from end to end it will be found that it is too weak on the side where the overlap of the two ends occurs and that the nut will not have enough strength to resist the tendency to spring and coil or uncoil when it is being tapped or when it is applied to a bolt. As before stated, the shoulders prevent the nut from being contracted or caused to spring inwardly when the tap is introduced or when the nut is being turned upon the bolt. This construction enables me to roll out the blanks in long bars or sheets, and a great many strips can be cut from the bar at a single heat, thus increasing the capacity of the machines.

Having thus described my invention, what I claim as new, and desire to secure by Letters Patent, is—

1. A nut consisting of a strip of metal made thickest in the center, tapering in each direction therefrom and coiled so that the thinner ends overlap upon the opposite sides of the thickened central portion of the nut-blank.

2. A nut consisting of a strip of metal made thickest in the center, tapering in each direction therefrom and formed with shoulders on opposite sides of its thickened portion, said strip being coiled until the ends overlap the thickened portion and abut against said shoulders.

3. A nut-blank made thickest in the center, tapering in opposite directions therefrom and formed with shoulders on opposite sides of its thickened central portion.

4. A nut consisting of a strip of metal made thickest in the center, tapering in each direction therefrom, and having two diagonally opposite sides parallel to form the ends of the nut when coiled, said strips being coiled so that the thinner ends overlap upon the opposite inclined sides.

5. A nut consisting of a strip of metal having its middle portion of a thickness equal to the depth of the nut, and tapered therefrom in each direction toward the ends, said strip being coiled so that the thinner ends overlap upon opposite sides of the thicker portion of the blank.

6. A nut formed from a strip of metal made thickest at the middle point and tapering toward the ends, having shoulders upon opposite sides at or near the middle of the strip, and the ends of said strip formed to fit the shoulders and abut upon them when coiled.

7. The method of manufacturing nuts which consists in heating and rolling a plate so that its central portion shall be thicker than its ends and shall be provided with shoulders which extend along the center of opposite sides of the plate; then severing nut-blanks from said plate while the latter is in a heated condition; and then coiling the blank, while heated, so that the ends overlap the thickened portion and abut against said shoulders, and the cut surface forms the interior wall of the nut.

In witness whereof I have hereunto set my hand.

MILTON A. CLENNAM.

Witnesses:
S. H. NOURSE,
JESSIE C. BRODIE.